United States Patent [19]
Edwards

[11] Patent Number: 5,865,069
[45] Date of Patent: Feb. 2, 1999

[54] LIGHT-WEIGHT BICYCLE HANDLEBAR STEM FOR USE WITH NON-THREADED FORK TUBES

[76] Inventor: Craig H. Edwards, 3765 Honolulu Ave., La Crescenta, Calif. 91214

[21] Appl. No.: 157,688

[22] Filed: Nov. 24, 1993

[51] Int. Cl.⁶ ................................................. B62K 21/12
[52] U.S. Cl. ........................ 74/551.1; 403/297; 280/279
[58] Field of Search ........................ 74/551.1; 280/276, 280/278, 279, 280; 403/297, 320, 370; 285/421

[56] References Cited

U.S. PATENT DOCUMENTS

| | | | |
|---|---|---|---|
| 667,232 | 2/1901 | Leaycraft | 74/551.1 |
| 3,312,139 | 4/1967 | Cristina | 403/297 |
| 4,113,395 | 9/1978 | Pawsat et al. | 403/22 |
| 5,201,243 | 4/1993 | Schneider | 74/551.1 |
| 5,251,494 | 10/1993 | Edwards | 74/551.1 |
| 5,267,485 | 12/1993 | Chi | 280/279 |
| 5,330,302 | 7/1994 | Chen | 411/79 |

*Primary Examiner*—Richard M. Lorence
*Assistant Examiner*—David M. Fenstermacher
*Attorney, Agent, or Firm*—Ladas & Parry

[57] ABSTRACT

A bicycle handlebar stem assembly, including a laterally displaceable fork tube, a handlebar stem with a hollow portion which fits around the fork tube, and an expanding device capable of displacing the fork tube perpendicularly to its axis tightly against the handlebar stem hollow portion; thus securely fixing the handlebar stem to the fork tube.

5 Claims, 2 Drawing Sheets

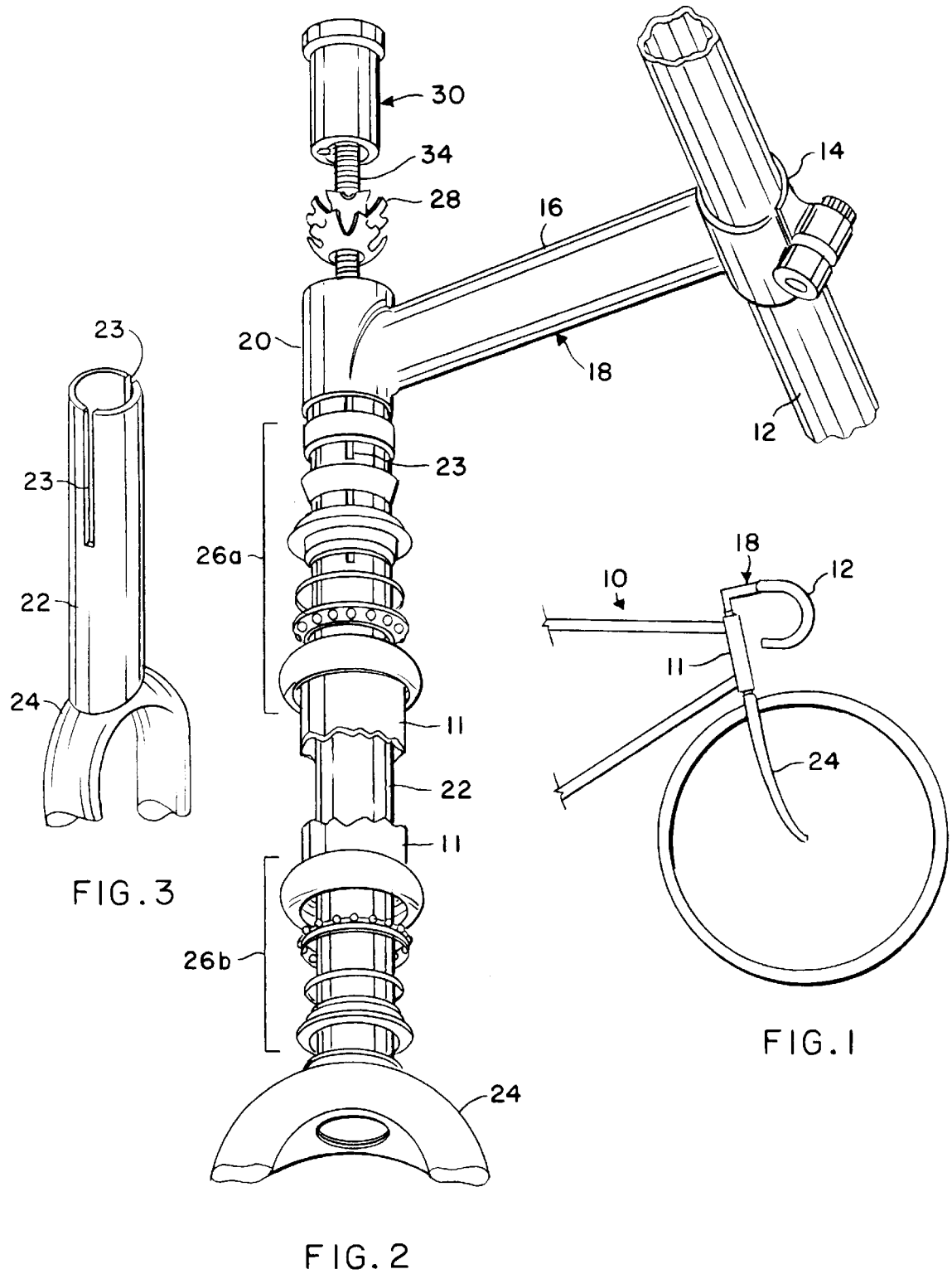

LIGHT-WEIGHT BICYCLE HANDLEBAR STEM FOR USE WITH NON-THREADED FORK TUBES

BACKGROUND OF THE INVENTION

This invention relates to a handlebar stem of a bicycle and the like. Specificaly to a bicycle stem and its bicycle mounting assembly.

DESCRIPTION OF THE PRIOR ART

The handlebar of a bicycle is generally mounted to the frame by means of a stem having a vertical tube housed telescopically inside, and mounted to the fork tube. The horizontal tube of the stem, while fixed to the vertical tube at its rearward end, attaches to the handlebar tube at its forward end.

Conventionally, the fork tube is threaded. The lock nut and top race of the headset assembly are threaded onto the end of the fork tube and tightened against one another, thus fixing the length of the headset assembly and correctly seating the headset bearings in their respective races. Typically, the fork tube terminates at the top, or just below the top of the lock nut of the headset assembly. This configuration serves two purposes: it protects the bare, external threads of the fork tube from exposure to the environment, limiting corrosion; and it hides the location where the vertical tube of the stem slides telescopically inside of the fork tube, making this transition more aesthetically pleasing.

With the fork tube terminating at the top of the headset assembly, the vertical tube of the stem acts as an extension of the fork tube. This extension allows for the adjustment in height of the handlebar depending on the depth at which the vertical tube is inserted telescopically into the fork tube. Once inserted, the stem is fixed to the fork tube by means of a fixing bolt which at its lower end is threaded into a conical nut or wedge nut—corresponding to the lower portion of the vertical tube. The fixing bolt extends upward through the end of the vertical tube, where it has its head. Where a conical nut is used, when the fixing bolt is turned, the conical nut is pulled upward into the vertical tube, in turn causing the lower portion of the vertical tube to expand and tighten against the inside wall of the fork tube. Where a wedge nut is used, the wedge nut is pulled against a complementary tapered surface at the lower portion of the vertical tube, causing the wedge nut to be displaced laterally and to tighten against the inside wall of the fork tube.

Recently, a new approach has been taken in the design of the front fork tube, headset assembly and stem. This new approach deviates from that mentioned above in that the fork tube is not threaded and extends through the headset assembly rather than terminating at the top of the headset. As in previous designs, the headset assembly, along with the head tube of the bicycle frame, still slides over the outside of the fork tube. Rather than fixing the length of the headset assembly using a lock nut, the vertical tube of the stem slides telescopically over the fork tube and is seated on top of the headset assembly. Once fixed to the fork tube, the vertical tube of the stem replaces the conventional headset's lock nuts and fixes the overall length of the headset assembly seating the bearings correctly within their respective races.

Most stems that are used with unthreaded fork tubes extending through the headset employ a similar design. To fix the vertical tube of the stem to the fork tube, the vertical tube of the stem is slotted axially. A binder boss(es) is then fixed to the vertical tube on either side of the slot with its axes perpendicular to the slot. In this configuration, a bolt running through the boss(es) spans the slot. Tightening the binder bolt(s) thus reduces the circumference of the vertical tube and presses it tightly against outside of the fork tube, thus fixing the stem to the fork tube.

The resulting headset, stem and fork assembly are both stronger and more rigid than previous designs because the effective diameter of the vertical tube of the stem is increased and no longer limited in size to the inner diameter of the fork tube because it no longer needs to fit inside of the fork tube. In addition, the lock nuts of the headset assembly are eliminated, thus making headset bearing adjustment easier—manipulating two wrenches to adjust the headset is no longer necessary.

This typical approach described above has several shortcomings attributable to the stem design. The binder bolt(s) are very bulky and aesthetically unpleasant. Because these boss(es) protrude rearward towards the bicyclist, the rider is liable to hit a knee on these boss(es) incurring injury. Additionally, the binder bolt(s) and the fork tube, where the vertical tube of the stem is slotted, are exposed to an environment where water, dirt and perspiration are prevalent, thus promoting corrosion.

A variation on the above design incorporates a similar fixing device located in the stem horizontal tube. When operated, this device also presses tightly against the fork tube fixing the stem to the fork tube. Although this approach conceals the fixing device creating a sleek appearance, it is more costly to manufacture. This design also requires penetrations in the horizontal tube which comprimise the horizontal tube strength in a critical area and potentually expose the interior of the stem to water, dirt and perspiration, thus promoting corrosion.

Despite these shortcomings, many stem manufacturers have employed the above described designs. This headset and stem assembly works as follows:

The fork tube is cut to a length that is 2 mm shorter than the stack height of the vertical tube of the stem, the headset, the head tube of the bicycle frame, and the stem height adjustments. The star-fangled-nut (SFN) is pressed into the fork tube to a height of approximately 15 mm below the top of the fork tube. The upper and lower tube cups are installed into the head tube of the bicycle frame; the bearings are installed into the head tube cups; and the fork crown race is pressed on to the fork crown of the fork. The head tube, followed by the adjustable race, compression ring, stem height adjusters and vertical tube of the stem are then slid over the outside of the fork tube. After the above is installed, the top cap is seated on top of the stem vertical tube and the socket head bolt is installed and threaded into the SFN. This bolt is then tightened to remove all excess play from the bearings. Once the desired bearing setting is achieved, the binder bolt(s) on the vertical tube of the stem are tightened to secure the assembly in place, fixing the length of the headset assembly and properly seating the headset bearings in their respective races.

In addition to the above-described stem assemblies, there are U.S. Patents of interest:

U.S. Pat. No. 757,154—Tate
U.S. Pat. No. 5,085,063—Van Dylse et al
U.S. Pat. No. 5,197,349—Herman
U.S. Pat. No. 5,201,242—Chi
U.S. Pat. No. 5,201,244—Stewart et al It is an object of the invention to provide a positive and secure means of fastening a bicycle stem to the unthreaded fork tube that extends through the headset of a bicycle.

Another object of the invention is to provide a stem fixing device which is simple, simple to use, and inexpensive to manufacture.

Another object of the invention is to provide a stem of inherent strength, structural efficiency and minimal weight.

Another object of the invention is to provide a stem whose means of fixing to the fork tube does not expose its hardware nor the fork tube to a corrosive environment.

Another object is to eliminate exterior nuts and bolts which can injure a cyclist's knees under some riding conditions.

Still another object is to provide a stem which is sleek and aesthetically pleasing.

DESCRIPTION OF DRAWINGS

FIG. 1 shows a bicycle and orientation of the stem with regard to the bicycle;

FIG. 2 shows an exploded view of a stem, headset and fork tube assembly with a wedge/cap assembly of the invention.

FIG. 3 shows a slotted fork tube;

SUMMARY OF THE INVENTION

Figure 4A:
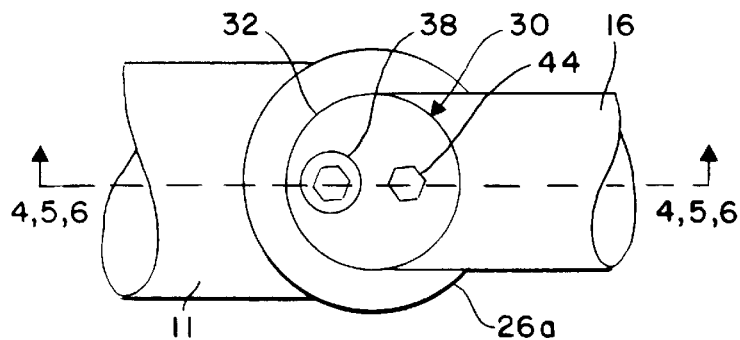
FIG. 4a is a plan view of the cap top.

The present invention is directed to the provision of a simple, effective handlebar stem, utilizing a non-threaded forked tube and an expanding means. The vertical tube of the stem slides over the outside of the fork tube. The wedge/cap assembly, serving as an expanding means, is placed inside of the fork tube. As the wedge/cap assembly is operated, it applies an outward radial force on the inside of the fork tube and, with the fork tube being slotted, the fork tube is free to be displaced laterally. This expansion presses the fork tube tightly against the inside of the vertical tube, which has a fixed diameter, fixing the stem to the fork tube.

DESCRIPTION OF THE INVENTION

Reference is now made to the drawings, FIGS. 1–6. As illustrated by FIG. 1, a bicycle handlebar stem 18 is the device which attaches the handlebar 12 to the rest of the bicycle 10, specifically to the fork tube 22 (not shown in FIG. 1) which is housed inside a bicycle frame 11 and an integral part of the fork 24.

FIG. 2, shows more specifically, a handlebar 12 is grasped in a handlebar tube 14 which is attached to the front or most forward end of a horizontal tube 16 of the stem 18. The back or most rearward end of the horizontal tube 16 is attached to the side of a vertical tube 20 of the stem 18. A lower headset 26b is shown at the lower end of the bicycle frame 11 in accordance with standard bicycle construction.

At the top end of the vertical tube 20 a stem fixing device 30, in accordance with the present invention, is provided for fixing a handlebar stem 18 to a bicycle's fork tube 22 which is unthreaded and extends through the headset 26a and frame 11. A wedge/cap assembly 30 is shown with a threaded stud 34 which is threaded into the star fangled nut 28, all of which are placed inside the fork tube 22.

In FIG. 3, a fork 24 with a fork tube 22, in addition to being cut to length, has slots 23 extending axially from its top edge. Upon assembly these slots will allow the fork tube 22 to be displaced laterally.

Figure 4:
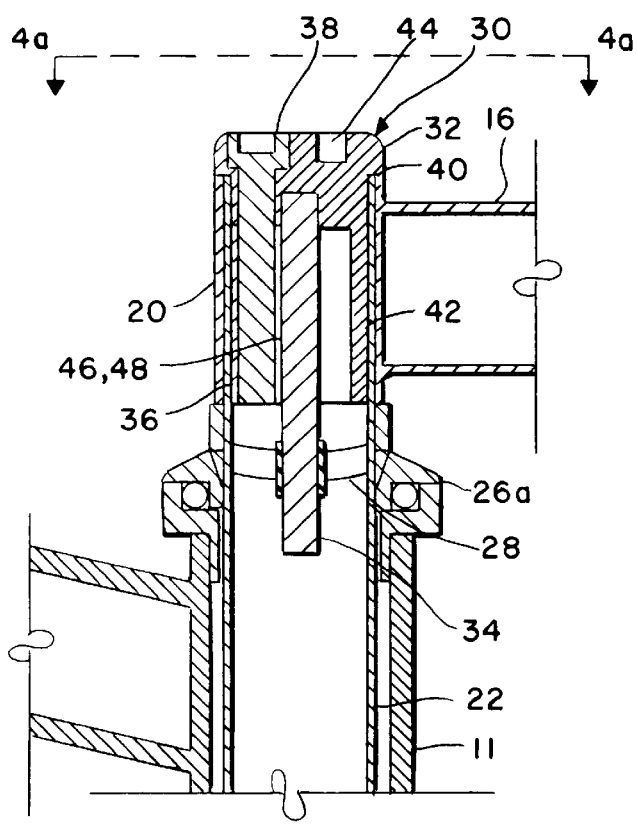
FIG. 4 shows a wedge/cap cross-section assembly, of the invention.

In FIG. 4 and 4a is a wedge/cap assembly 30 serving as the expanding means and consisting of a cap 32, a threaded stud 34, a bolt 38, and a wedge nut 36.

As illustrated in FIG. 4 and 4a, the cap 32 has two concentric portions, an upper disk portion 40 and a lower cylindrical portion 42. The cap's upper portion 40 is a circular disk whose outer diameter is approximately equal to or greater than that of the vertical tube 20 of the stem 18. Integral to the disk portion 40 of the cap is an adjusting aperture 44. The adjusting aperture 44 of the wedge/cap assembly 30 is hexagonal in shape and accepts an hex key to apply torque to the cap 32. Turning a hex key which is inserted in the adjusting aperture 44 rotates, the wedge/cap assembly 30 about its axis. Attached to and concentric with the cap is the threaded stud 34 which protrudes from the tapered end of the cylindrical portion 42 and has threads complementary to that of the star fangled nut 28.

In addition, the disk portion 40 has a through hole which is large enough for the bolt 38 to slide through and small enough so that the head of the bolt 38 is captured but allowed to rotate. Bolt 38 threads into a wedge nut 36, thus seating the diagonal face 48 of the wedge nut 36 against the diagonal face 46 of the cylindrical portion 42 of the cap. Prior to the bolt 38 being tightened, the cylindrical portion 42 of the cap, along with the wedge nut 36, form a cylinder whose outer diameter is slightly smaller than the inner diameter of the fork tube 22.

Figure 5:
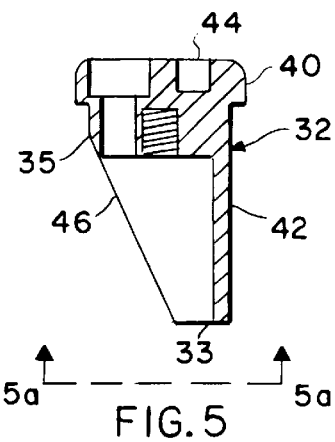
FIG. 5 is a cross-section view of a cap taken along same line as FIG. 4.
Figure 5A:
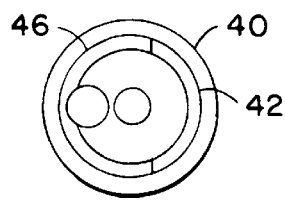
FIG. 5a is a section looking up at the bottom of the cap.

As illustrated in FIG. 5 and 5a, The cap's lower cylindrical portion 42 lies in a plane perpendicular to the axis of the cylinder, and its top surface is integral with the bottom of the disk portion 40 of the cap 32 there is also a bottom end 33. Part of the bottom of the cylinder lies in a plane non-perpendicular to the axis of the cylinder. The result is a tapered or diagonal surface 46 on the bottom of the cylindrical portion 42 which extends from the bottom end 33 to a point 35 below disk portion 40. This angled surface is complementary to the tapered diagonal surface 48 of the wedge nut.

Figure 6:
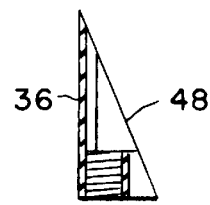
FIG. 6 shows a wedge nut.

In FIG. 6, a wedge nut is shown with a threaded hole to accept bolt 38 and a diagonal surface 48 is complementary to the diagonal surface 46 of the lower cylindrical portion 42.

The installation sequence is as follows: After headset assembly 26a is in place, stem 18 is slid over the fork tube 22. The wedge/cap assembly 30 is then placed inside of the fork tube 22. A hex key is then inserted into the adjusting aperture 44 and turned. This turns the entire wedge/cap assembly 30 threading stud 34 into the star fangled nut 28 and seating the disk portion 40 of the wedge/cap assembly 30 on the top of the vertical tube 20 of the stem. With further turning, the upper disk portion 40 of the cap bears down on the top surface of the vertical tube 20 of the stem which, in turn, presses down on the headset assembly 26a removing excess play from the bearings of the headset 26a.

Once the desired headset 26a adjustment is achieved, the bolt 38 is operated, bearing the diagonal face 48 of the wedge nut 36 against the diagonal face 46 of the cylindrical portion 42 of the cap. With further tightening of the bolt 38, the wedge nut 36 slides relative to the cap 32 along their angled surfaces 48 and 46 respectively. This direction of motion, defined by the angled surfaces 48 and 46, has both an axial and a lateral component relative to the axis of the fork tube 22. The lateral component of motion of the wedge/cap assembly 30 effectively expands laterally against the inside of the fork tube 22. With the fork tube 22 being slotted, it is displaced laterally and presses tightly against the inside of the fixed diameter vertical tube 20. This securely connects the stem 18 to the fork tube 22.

Thus the reader will see that the stem fixing device disclosed by this invention provides a very secure, lightweight and simple means of attaching the stem to an unthreaded fork tube which extends through the headset of a bicycle and the like. The reader will also understand that various embodiments of this stem fixing device offer alternate methods of executing the same design principle as that described in the preferred embodiment.

With the present stem assembly, rather than the stem fixing itself around the fork tube, the fork tube is slotted so it can be displaced laterally to fix the fork tube to the stem. This displacement is effected by the cap wedge assembly located inside the fork tube where it is protected from the corrosive environment typical of most riding conditions. This eliminates the need for external bosses and bolts which can be injurious to a rider's knees under some conditions; and results in a stem that is simple, structurally efficient, sleek and aesthetically pleasing.

What is claimed is:

1. A bicycle fork and handlebar stem assembly including a stem mounting device, comprising:

a fork tube, a portion of which has a cylindrical inner surface, said fork tube portion comprising means for allowing said fork tube portion to be displaced perpendicular to its axis;

a handlebar stem having a hollow portion defining an inner wall which fits around said fork tube portion; and an expanding means which fits within said cylindrical inner surface of said fork tube portion and, when operated, expands laterally of said fork tube and displaces said fork tube portion laterally against said inner wall of said handlebar stem hollow portion.

2. A bicycle fork and handlebar stem assembly as in claim 1, wherein said means for allowing said fork tube to be displaced perpendicular to its axis comprises at least one longitudinal slot formed in said fork tube portion.

3. A bicycle fork and handlebar stem assembly as in claim 1, wherein said fork tube has an open top end, and said expanding means comprises an adjusting means operable, prior to said expanding means displacing said fork tube portion laterally against said inner wall of said handlebar stem hollow portion, to effect a bearing force of said expanding means against the top end of said handlebar stem.

4. A bicycle fork and handlebar stem assembly as claimed in claim 1, wherein said fork tube has an open top end, and said expanding means is insertable in said open top end and comprises a wedge cap, a wedge, and a rod member, said wedge cap and wedge having complementary engaging angled surfaces, and said rod member is coupled to said wedge, whereby, upon movement of said rod member, said wedge and wedge cap slide at their engaging surfaces to effect relative lateral movement between said wedge cap and said wedge to thereby displace said fork tube portion laterally against said inner wall of said handlebar stem hollow portion.

5. A bicycle fork and handlebar stem assembly as claimed in claim 4, wherein said rod member is a threaded bolt, and said wedge has internal threads which mate with said threaded bolt, whereby rotation of said threaded bolt draws said wedge against said wedge cap along said angled surfaces.

* * * * *